United States Patent
Teneze

(10) Patent No.: US 7,582,853 B2
(45) Date of Patent: Sep. 1, 2009

(54) METHOD AND DEVICE FOR PRODUCING AN OPTICAL LINK USING LIGHT FLASHES

(75) Inventor: Bernard Teneze, Trouy (FR)

(73) Assignee: MBDA France, Paris (FR)

( * ) Notice: Subject to any disclaimer, the term of this patent is extended or adjusted under 35 U.S.C. 154(b) by 245 days.

(21) Appl. No.: 11/573,821

(22) PCT Filed: Jul. 28, 2005

(86) PCT No.: PCT/FR2005/001972

§ 371 (c)(1),
(2), (4) Date: Feb. 16, 2007

(87) PCT Pub. No.: WO2006/024754

PCT Pub. Date: Mar. 9, 2006

(65) Prior Publication Data

US 2008/0018264 A1    Jan. 24, 2008

(30) Foreign Application Priority Data

Aug. 20, 2004   (FR) .................................. 04 09014

(51) Int. Cl.
 F41G 7/30 (2006.01)
 F41G 7/00 (2006.01)
 F42B 15/01 (2006.01)
 F42B 15/00 (2006.01)

(52) U.S. Cl. ...................... 244/3.1; 244/3.11; 244/3.13; 244/3.15; 244/3.16

(58) Field of Classification Search ........... 244/3.1–3.3; 89/1.11; 356/614, 615, 620, 138, 140, 141.2, 356/141.5; 701/1, 3, 4; 398/118–120, 130, 398/131; 250/200, 201.1, 203.1–203.7, 206, 250/206.1–206.3
See application file for complete search history.

(56) References Cited

U.S. PATENT DOCUMENTS

| 4,173,777 | A |   | 11/1979 | Schmit et al. |
| 4,179,085 | A | * | 12/1979 | Miller, Jr. .................. 244/3.11 |
| 4,419,012 | A | * | 12/1983 | Stephenson et al. ...... 356/141.5 |
| 4,424,943 | A | * | 1/1984  | Zwirn et al. ............... 244/3.11 |
| 4,600,305 | A | * | 7/1986  | Priddy ....................... 244/3.16 |
| 4,710,028 | A |   | 12/1987 | Grenier et al. |
| 5,062,586 | A |   | 11/1991 | Hobson et al. |
| 5,081,345 | A | * | 1/1992  | Grenier et al. ........... 250/206.1 |
| 5,147,088 | A | * | 9/1992  | Smith et al. ................ 244/3.11 |
| 5,332,176 | A |   | 7/1994  | Wootton et al. |

(Continued)

FOREIGN PATENT DOCUMENTS

FR   2274887   1/1976

(Continued)

OTHER PUBLICATIONS

International Search Report dated Feb. 16, 2006.

*Primary Examiner*—Bernarr E Gregory
(74) *Attorney, Agent, or Firm*—Dickinson Wright, PLLC

(57) ABSTRACT

The invention relates to a method and device for producing an optical link using light flashes. According to the invention, an arrangement (13) comprising a plurality of capacitors (C1 to C5) is provided in order to power a flash lamp (3) and the connection of said capacitors within the arrangement is controlled in a programmed manner such that the resulting capacitance thereof increases from one flash in the next.

9 Claims, 2 Drawing Sheets

U.S. PATENT DOCUMENTS

| | | | |
|---|---|---|---|
| 5,350,134 A * | 9/1994 | Crawford | 244/3.16 |
| 5,651,512 A * | 7/1997 | Sand et al. | 244/3.11 |
| 5,708,583 A * | 1/1998 | Solenne et al. | 701/4 |
| 6,199,794 B1 * | 3/2001 | Naiman et al. | 244/3.16 |
| 7,410,119 B2 * | 8/2008 | Leon et al. | 244/3.11 |
| 7,474,856 B2 * | 1/2009 | Teneze et al. | 244/3.16 |
| 2002/0154293 A1 | 10/2002 | Wells et al. | |
| 2005/0174559 A1 | 8/2005 | Teneze et al. | |

FOREIGN PATENT DOCUMENTS

| | | |
|---|---|---|
| FR | 2583523 | 12/1986 |
| WO | 2004064274 | 7/2004 |

\* cited by examiner

METHOD AND DEVICE FOR PRODUCING AN OPTICAL LINK USING LIGHT FLASHES

FIELD OF THE INVENTION

The present invention relates to a method and a device for producing an optical link by light flashes between a flashlamp and a receiver that receives said light flashes, most particularly a link to be employed in devices for locating and guiding missiles, such as for example as described in document U.S. Pat. No. 4,710,028 (FR-2 583 523).

BACKGROUND OF THE RELATED ART

In known devices of this type, the flashlamp may be mounted onboard said missile or else placed in a fixed station, the optical link then including a mirror mounted onboard the missile and sending said light flashes back toward said receiver.

To be able to provide very long optical links, it is necessary for said flashlamp to be powerful, and it therefore consumes a large amount of energy. As a result, such a flashlamp is necessarily bulky and has to be provided with means capable of discharging the heat that it generates to the outside.

SUMMARY OF THE INVENTION

The object of the present invention is to remedy these drawbacks by providing an optical link by light flashes of low energy consumption using a flashlamp that is not very bulky and does not require any heat dissipation.

For this purpose, according to the invention, the method for producing an optical link, formed by a series of light flashes between a flashlamp and a device for locating a missile moving away from said locating device, each light flash being generated by an electrical discharge produced by capacitive means and applied to said flashlamp, is noteworthy in that:
   said capacitive means are produced in the form of an arrangement of a plurality of capacitors; and
   the connection of said capacitors within said arrangement is controlled in a programmed manner in such a way that the resultant capacitance of said capacitive means increases from one flash to the next.

Thus, thanks to the present invention, it is possible to vary the power of said flashlamp as a function of time so that the power is small when the missile is close to the locating device and progressively increases with the flashlamp/locating device distance, the power acquired at the maximum range of the missile being delivered only at the end of the range. Such a variation therefore reduces the energy consumption by the flashlamp, thereby reducing the heat generated in the flashlamp and therefore its volume.

To implement the method according to the invention it is advantageous, on the one hand, for said capacitive means to comprise a plurality of circuit branches each comprising a capacitor and a controlled switch, said circuit branches being connected in parallel to one another between the anode and the cathode of said flashlamp, and, on the other hand, for the device to include:
   a high-voltage generator for supplying said capacitors; and
   means for controlling said controlled switches, making it possible, on the one hand, to charge said capacitors from said high-voltage generator and, on the other hand, to discharge said capacitors into said flashlamp so that the electrical discharge corresponding to a flash is larger than the electrical discharge corresponding to the preceding flash and smaller than the electrical discharge corresponding to the next flash.

Preferably, said capacitive means include an additional capacitor connected in parallel to said circuit branches between the anode and the cathode of said flashlamp.

In one advantageous embodiment:
   the capacitors of said circuit branches which, from the first to the last, have different capacitances, are classified in order of increasing capacitance;
   the additional capacitor has a lower capacitance than said first capacitor having the smallest capacitance among the capacitors of said circuit branches;
   the first flash of the series results from the discharge of just the additional capacitor;
   the second flash of the series results from the combined discharge of said additional capacitor and said first capacitor of said circuit branches;
   the third flash of the series results from the combined discharge of said additional capacitor and said first and second capacitors of said circuit branches;
   in general, the intermediate flash of index i of the series (i being an integer smaller than the total number of flashes in the series) results from the combined discharge of said additional capacitor and the i−1 first capacitors of said circuit branches; and
   the last flash of the series results from the combined discharge of said additional capacitor and all of said capacitors of said circuit branches.

Thus, it is possible to obtain, at the end of the range of the missile, a high power for said flashlamp without the use of high-capacitance capacitors.

Preferably, the device according to the present invention includes programmed means that are programmed according to the trajectory of said missile and drive said means for controlling said controlled switches and determine the time interval between two successive light flashes.

Advantageously, such drive means are initialized, possibly with a delay, by the launch of said missile.

The time interval between two successive light flashes may be fixed and the same for all the flashes of the series. However, it may be varied, for example according to an exponential law.

In the usual case in which said flashlamp is of the type that includes a trip electrode, the device according to the invention includes a very high-voltage generator for supplying said trip electrode and this generator is controlled by said means for controlling said switches.

The figures of the appended drawing will clearly explain how the invention can be realized. In these figures, identical references denote similar elements.

DETAILED DESCRIPTION OF THE INVENTION

Figure 1:
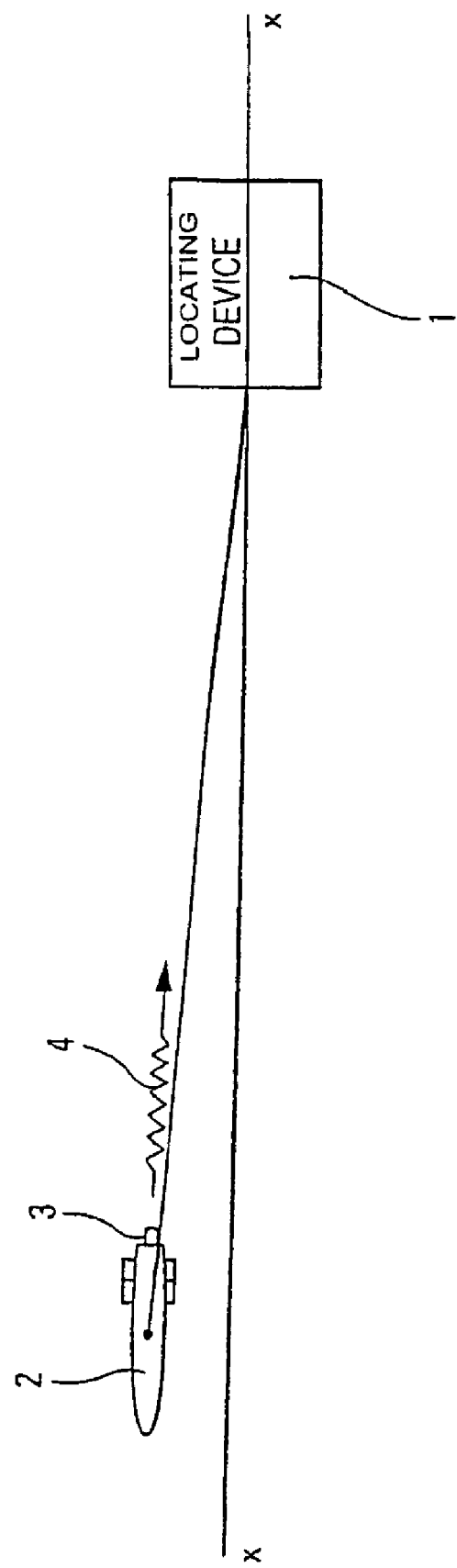
FIG. 1 illustrates schematically a method of locating a missile.

FIG. 1 shows a device 1 capable of locating a missile 2 relative to a reference axis X-X (for example a line of sight), said missile 2 moving away at a constant speed from the locating device 1. The latter is, for example, of the type described in document U.S. Pat. No. 4,710,028 (FR-2 583 523).

For the purpose of locating the missile 2 by the device 1, said missile includes a flashlamp 3 capable of emitting light pulses 4 toward said device 1, which includes a receiver for receiving said light pulses (device not being represented otherwise).

Figure 2:
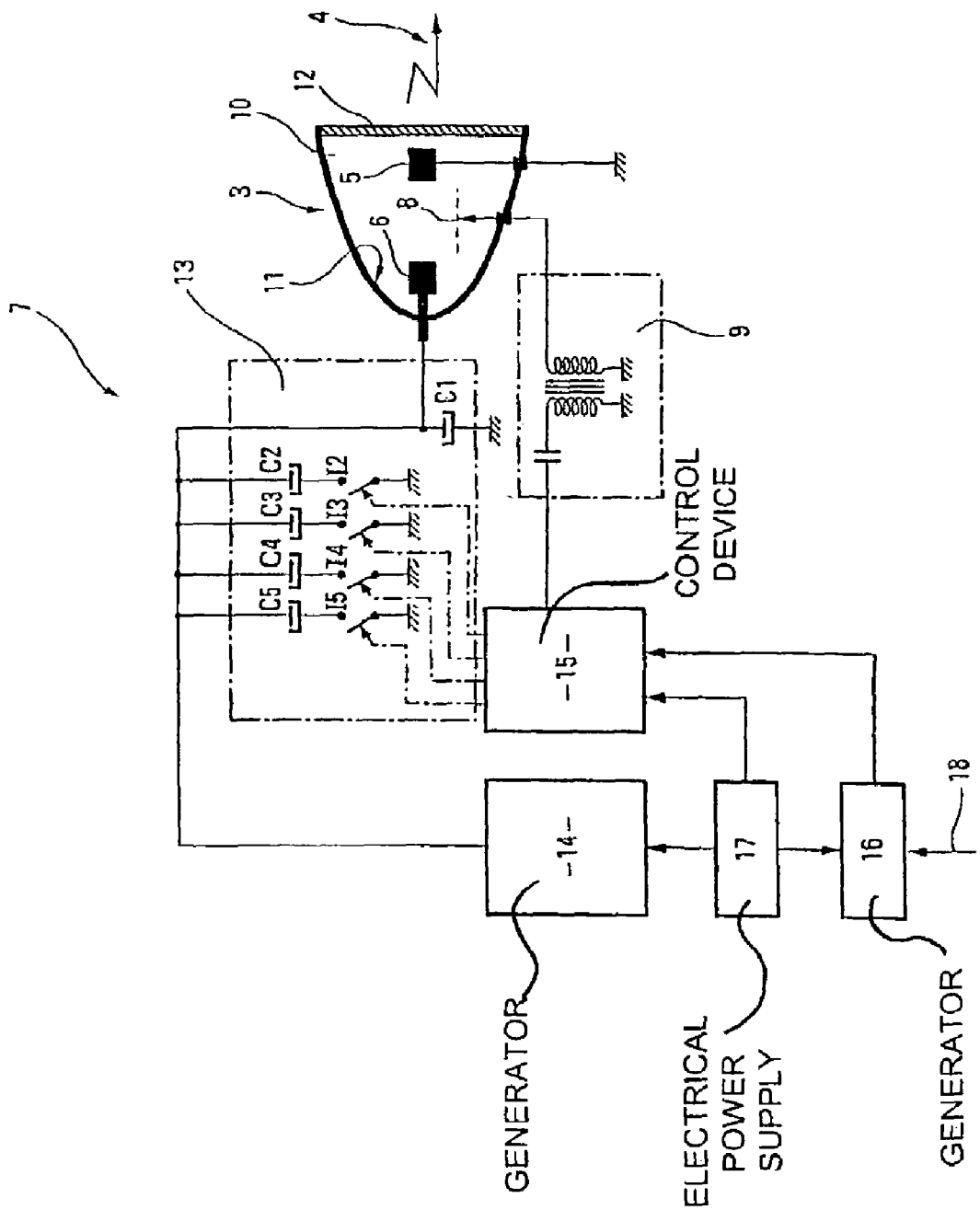
FIG. 2 is the block diagram of one embodiment of the light-pulse emitter mounted onboard said missile.

As shown in FIG. 2, the flashlamp 3 includes a grounded cathode 5, an anode 6 supplied by a control device 7, and a trip electrode 8 supplied by a very high-voltage generator 9 (for example one operating at the order of 10 kV). The flashlamp includes a cavity 10 that forms a reflector 11 and is closed off by an optical window 12. In addition, the cavity 10 is filled with a rare gas, for example xenon.

The control device 7 mounted onboard the missile 1 comprises capacitive means 13, a high-voltage generator 14 (for example operating at 500 V) capable of charging said capacitive means 13, a control device 15 for controlling said capacitor means (13) and the very high-voltage generator 9, a programmed synchronization-pulse generator 16 for driving the control device 15, and an electrical power supply 17, for example a thermal battery, for supplying the generator 14, the device 15 and the generator 16.

In the embodiment shown in FIG. 2, the capacitive means 13 comprise five capacitors C1 to C5 connected in parallel, the anodes of said capacitors being commoned, on one side, to the high-voltage generator 14 and, on the other side, to the anode 6 of the flashlamp 3.

Moreover, the cathode of the capacitor C1 is connected directly to ground, whereas the cathodes of the capacitors C2 to C5 are respectively connected to ground via switches I2 to I5 (for example MOS transistors) controlled by the control device 15.

Preferably, the capacitance of the capacitor C5 is higher than that of the capacitor C4, which is itself higher than that of the capacitor C3, which is itself higher than the capacitance of the capacitor C2, which is itself higher than that of the capacitor C1. For example, if the capacitance of the capacitor C1 is equal to c1, the capacitances c2 to c5 of the capacitors C2 to C5 may be equal to 2c1, 3c1, 4c1 and 5c1, respectively.

Since the capacitor C1 is permanently linked to the generator 14, it is charged by the latter.

Upon launching the missile 2, a control command is sent to the programmed pulse generator 16 via a control line 18 in which a delay device (not shown) may optionally be interposed. In response to this control command, the generator 16 drives the device 15 so that it closes the switches I2 to I5 so that the capacitors C2 to C5 are charged by the generator 14. When a switch is closed, it remains in that state.

Next, the operation of the device 7 and the flashlamp 3 takes place as follows:

at time t1, the generator 16 emits a first pulse that is sent to the control device 15. The latter actuates the very high-voltage generator 9 so that the trip electrode 8 is raised to this very high voltage. Since the voltage across the terminals of the capacitor C1 is also applied between the cathode 5 and the anode 6, it follows that an electric arc is generated between these electrodes, and said capacitor C1 discharges. The power of this brief arc, which forms a first light flash, is therefore proportional to the electric charge accumulated in just the capacitor C1, which charge is itself dependent on the capacitance of this capacitor C1. At the end of said first light flash, the control device 15, driven by the generator 16, deactuates the very high-voltage generator 9 and closes the switch I2 so that the capacitors C1 and C2 are recharged by the generator 14;

at time $t2=t1+\Delta t1$ after t1, the generator 16 emits a second pulse and the control device 15, which receives it, actuates the very high-voltage generator 9. This results in the flashlamp 3 generating a second light flash, the power of which is proportional to the sum of the electric charges accumulated in the capacitors C1 and C2. At the end of the second light flash, the control device 15 deactuates the very high-voltage generator 9 and closes the switch I3. The capacitors C1, C2 and C3 are then charged by the generator 14;

at time $t3=t2+\Delta t2$ after t2, the generator 16 emits a third pulse and, in response, the control device 15 actuates the very high-voltage generator 9. Thus, in a similar way to what was described above, the flashlamp 3 generates a third light flash, the power of which is proportional to the sum of the electric charges accumulated in the capacitors C1, C2 and C3. At the end of the third light flash, the control device 15, driven by the generator 16, deactuates the very high-voltage generator 9 and closes the switch I4. The capacitors C1, C2, C3 and C4 are then recharged by the generator 14;

at time $t4=t3+\Delta t3$ after t3, the generator 16 emits a fourth pulse and, in response, the control device 15 actuates the very high-voltage generator 9. Thus, in a similar way to what was described above, the flashlamp 3 generates a fourth light flash, the power of which is proportional to the sum of the electric charges accumulated in the capacitors C1, C2, C3 and C4. At the end of the fourth light flash, the control device 15 deactuates the very high-voltage generator 9 and closes the switch I5. The capacitors C1, C2, C3, C4 and C5 are then recharged by the generator 14; and at time $t5=t4+\Delta t4$ after t4, the generator 16 emits a fifth pulse and, in response, the control device 15 actuates the very high-voltage generator 9. Thus, in a similar way to what was described above, the flashlamp 3 generates a fifth light flash, the power of which is proportional to the sum of the electric charges accumulated in the capacitors C1, C2, C3, C4 and C5.

Thus it may be seen that, flash after flash, the power of said flashes increases up to a maximum when the missile 2 reaches its maximum range.

The times t1 to t5 and the time intervals $\Delta t1$ to $\Delta t4$ are programmed in the generator 16. Said time intervals $\Delta t1$ to $\Delta t4$ may be constant and equal. However, they may be variable.

From the foregoing, it is readily understood that, thanks to the present invention, said flashlamp 3 is operated in a stable manner, with a programmed power variation, capable of preventing the flash detector (a CCD or CMOS sensor) from saturating at the launch of the missile. In addition, a substantial amount of energy is saved, enabling the range of the missile 2 to be increased for the same power. The substantial reduction in the heat generated by the flashlamp 3 that results therefrom makes it possible to reduce the size of the optical block associated with said lamp and to produce the latter from materials that are less critical, in respect of high-temperature resistance, than those currently used.

The invention claimed is:

1. A method to produce an optical link, formed by a series of light flashes between a flashlamp and a device to locate a missile moving away from said locating device, each light flash being generated by an electrical discharge produced by a capacitive unit and applied to said flashlamp, the method comprising:

configuring said capacitive unit to comprise a plurality of capacitors; and controlling said capacitors in a programmed manner in such a way that a resultant capacitance of said capacitors is used to generate the series of light flashes and increases from one light flash to the next.

2. A device to produce an optical link, formed by a series of light flashes between a flashlamp and a device to locate a missile moving away from said locating device, each light flash being generated by an electrical discharge produced by a capacitive unit and applied to said flashlamp, comprising:
 a capacitive unit comprising an arrangement of a plurality of circuit branches each comprising a capacitor and a controlled switch, said circuit branches being connected in parallel to one another between an anode and a cathode of said flashlamp;
 a high-voltage generator to supply voltage to said capacitors; and
 a control device to control said controlled switches to charge said capacitors using said high-voltage generator and to discharge said capacitors into said flashlamp so that an electrical discharge corresponding to a flash is larger than an electrical discharge corresponding to a preceding flash generated before the flash and smaller than a electrical discharge corresponding to a next flash generated after the flash.

3. The device as claimed in claim 2, wherein said capacitive unit includes an additional capacitor connected in parallel to said circuit branches between the anode and the cathode of said flashlamp.

4. The device as claimed in claim 3, wherein:
 the capacitors of said circuit branches have different capacitances and are disposed in said capacitive unit in order of increasing capacitance;
 the additional capacitor has a lower capacitance than a first capacitor included in the capacitors, said first capacitor having the smallest capacitance among the capacitors of said circuit branches;
 a first flash results from a discharge of the additional capacitor;
 a second flash results from a combined discharge of said additional capacitor and said first capacitor;
 a third flash results from a combined discharge of said additional capacitor and said first capacitor and a second capacitors; and
 an ith results from a combined discharge of said additional capacitor and said first capacitor through said ith capacitor.

5. The device as claimed in claim 2, further comprising a programmable drive unit to drive said control device.

6. The device as claimed in claim 5, further comprising an initialization unit to initialize said programmable drive unit at a launch of said missile.

7. The device as claimed in claim 5, wherein a time interval between two successive light flashes is fixed and is the same for all the flashes of the series.

8. The device as claimed in claim 2, wherein a time interval between two successive light flashes varies in relation to another time interval between two other successive light flashes in the series.

9. The device as claimed in claim 2, wherein said flashlamp comprises a trip electrode, wherein said trip electrode is supplied with voltage from a very high voltage generator, and said very high-voltage generator is controlled by said control device.

* * * * *